(12) United States Patent
Wang et al.

(10) Patent No.: US 10,592,008 B1
(45) Date of Patent: Mar. 17, 2020

(54) MOUSE HAVING A SHAPE-CHANGING ENCLOSURE

(71) Applicant: Apple Inc., Cupertino, CA (US)

(72) Inventors: Paul X. Wang, Cupertino, CA (US); Hongcheng Sun, San Ramon, CA (US); Alex J. Lehmann, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 51 days.

(21) Appl. No.: 15/837,466

(22) Filed: Dec. 11, 2017

Related U.S. Application Data

(60) Provisional application No. 62/554,148, filed on Sep. 5, 2017.

(51) Int. Cl.
*G06F 3/0354* (2013.01)

(52) U.S. Cl.
CPC .................. *G06F 3/03543* (2013.01)

(58) Field of Classification Search
CPC ... G06F 3/03543; G06F 3/016; H01L 41/0926
See application file for complete search history.

(56) References Cited

U.S. PATENT DOCUMENTS

| | | | |
|---|---|---|---|
| 5,867,082 A | 2/1999 | Van Zeeland | |
| 8,063,892 B2 | 11/2011 | Shahoian et al. | |
| 8,169,402 B2 | 5/2012 | Shahoian et al. | |
| 8,174,495 B2 | 5/2012 | Takashima et al. | |
| 8,493,190 B2 | 7/2013 | Periquet et al. | |
| 8,633,916 B2 | 1/2014 | Bernstein et al. | |
| 8,878,657 B2 | 11/2014 | Periquet et al. | |
| 9,213,409 B2 | 12/2015 | Redelsheimer et al. | |
| 9,727,140 B2 | 8/2017 | Norieda | |
| 9,851,827 B2 | 12/2017 | Miller et al. | |
| 9,898,119 B2 | 2/2018 | Aberg et al. | |
| 2002/0054060 A1* | 5/2002 | Schena | G01D 7/007 715/701 |
| 2009/0250267 A1* | 10/2009 | Heubel | G06F 3/016 178/18.03 |
| 2010/0283731 A1* | 11/2010 | Grant | G06F 3/016 345/158 |
| 2012/0206248 A1 | 8/2012 | Biggs | |
| 2013/0250500 A1 | 9/2013 | Tossavainen et al. | |
| 2014/0197936 A1 | 7/2014 | Biggs et al. | |
| 2014/0368455 A1 | 12/2014 | Croisonnier et al. | |
| 2015/0177899 A1 | 6/2015 | Degner et al. | |
| 2016/0018894 A1 | 1/2016 | Yliaho et al. | |
| 2016/0132116 A1* | 5/2016 | Grant | G06F 3/016 345/156 |

(Continued)

FOREIGN PATENT DOCUMENTS

WO   WO2014/018118   1/2014

*Primary Examiner* — Robert J Michaud
(74) *Attorney, Agent, or Firm* — Brownstein Hyatt Farber Schreck, LLP

(57) ABSTRACT

Systems and methods for changing the shape of a mouse or other input device are described. In one embodiment, a mouse includes an articulating member that defines a curvature of an exterior surface of the mouse. The mouse may include one or more actuators for manipulating the articulating member to change the contour of the exterior surface of the mouse. The curvature may be changed to optimize the ergonomics of the mouse and/or deliver tactile feedback to users.

19 Claims, 22 Drawing Sheets

(56) References Cited

U.S. PATENT DOCUMENTS

2016/0209941 A1\* 7/2016 Hadas ................ G06F 3/011
2016/0246441 A1\* 8/2016 Westerman .......... G06F 3/0235
2018/0081483 A1 3/2018 Camp et al.

\* cited by examiner

MOUSE HAVING A SHAPE-CHANGING ENCLOSURE

CROSS-REFERENCE TO RELATED APPLICATION(S)

This application is a nonprovisional patent application of and claims the benefit of U.S. Provisional Patent Application No. 62/554,148, filed on Sep. 5, 2017 and titled "Mouse Having A Shape-Changing Enclosure," the disclosure of which is hereby incorporated herein by reference in its entirety.

FIELD

Embodiments described herein are directed to input devices for computing systems and, more particularly, to systems and methods for changing the shape of a mouse.

BACKGROUND

Electronic devices can receive user input from a mouse. Traditional computer mice have a static form, which is not suitable for all tasks. Furthermore, different users prefer or require different shapes of computer mice. The embodiments described herein may be used to improve the function of a computer mouse.

SUMMARY

Certain embodiments described herein relate to, include, or take the form of a mouse having an enclosure, which includes an articulating member and defines an exterior surface configured to receive a palm of a hand. The mouse further includes an actuator disposed within the enclosure and coupled to the articulating member. The actuator is configured to move the articulating member between a first configuration and a second configuration. The first configuration results in the exterior surface having a first curvature. The second configuration results in the exterior surface having a second curvature different from the first curvature.

Other embodiments described generally reference a mouse that includes an enclosure defining a top surface configured to interface with a palm of a hand and an actuator disposed within the enclosure and configured to change a curvature of the top surface.

Still further embodiments described herein generally reference a method that includes the steps of detecting a condition using a processor operably coupled to an actuator of a mouse, and responsive to detecting the condition, moving, by the actuator, an articulating member from a first configuration to a second configuration. The first configuration results in the exterior surface having a first curvature. The second configuration results in the exterior surface having a second curvature different from the first curvature.

BRIEF DESCRIPTION OF THE DRAWINGS

Reference will now be made to representative embodiments illustrated in the accompanying figures. It should be understood that the following descriptions are not intended to limit this disclosure to one preferred embodiment. To the contrary, the disclosure provided herein is intended to cover alternatives, modifications, and equivalents as may be included within the spirit and scope of the described embodiments, and as defined by the appended claims.

FIGS. 18A-18C are diagrams showing a shape of a mouse changing responsive to detecting a user's digit at a position on the surface of the mouse.

The use of the same or similar reference numerals in different figures indicates similar, related, or identical items.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments described herein are directed to systems and techniques for changing the shape of a mouse or other input device. In particular, the embodiments are directed to a mouse having an articulating member that defines a profile shape having a curvature along an exterior surface of the mouse. The mouse may include one or more actuators for manipulating the articulating member to change the curvature of the exterior surface of the mouse. The curvature may be changed to optimize the ergonomics of the mouse and/or deliver tactile feedback to users.

In one embodiment, the profile shape or curvature of the mouse is optimized to fit a user's hand. The mouse may include various sensors for determining if the curvature matches a contour of the user's hand, and the shape of the mouse may be changed accordingly.

In another embodiment, the profile shape or curvature of the mouse is optimized for a particular function or activity being performed at an associated computing device. For example, a relatively flat curvature may be chosen for tasks that are typically performed on a trackpad and a curved surface may be chosen for tasks that are typically performed using a traditional mouse.

In another embodiment, the shape of the mouse may be changed to provide feedback to a user of the mouse and/or an associated computing device. The shape of the mouse may be changed in response to a change at a user interface of a computing device associated with the mouse.

These and other embodiments are discussed below with reference to FIGS. 1-22. However, those skilled in the art will readily appreciate that the detailed description given herein with respect to these Figures is for explanatory purposes only and should not be construed as limiting.

Figure 1:
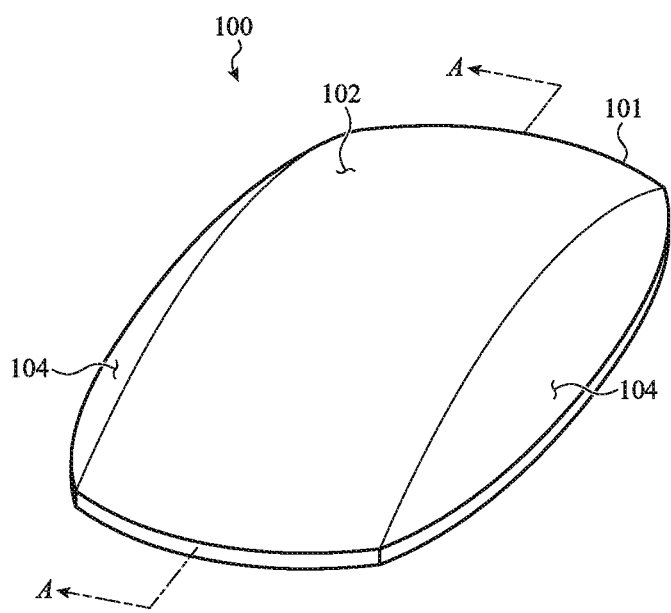
FIG. 1 depicts an example mouse that is configured to change shape.

FIG. 1 depicts an example mouse 100 that is configured to change shape. The mouse 100 includes an enclosure 101 that defines an exterior surface configured to interface with a palm and/or fingers of a hand of a user. In various embodiments, the shape of the mouse 100 is defined by one or more articulating members configured to move and/or change curvature. As the articulating member(s) transition between various configurations, the shape of the exterior surface of the mouse 100 changes.

In one embodiment, the enclosure 101 includes an articulating member configured to change a profile shape or curvature of a top surface 102 of the exterior surface. Additionally or alternatively, the articulating member may be configured to change a thickness (e.g., height) of the mouse. The mouse 100 may include an actuator disposed within the enclosure. The actuator may be configured to move the articulating member between different configurations, thereby changing the profile shape or curvature of the exterior surface, as discussed in more detail below with respect to FIGS. 2A-2B.

In one embodiment, the enclosure 101 includes one or more side articulating members configured to change a shape of the mouse. Side articulating members may be configured to interface with digits of a hand of a user, such as fingers or thumbs. The side articulating members may be configured to move and/or change shape to change a curvature or position of a side surface 104 of the exterior surface. The mouse 100 may include one or more actuators configured to transition the side articulating members between various configurations (e.g., to move and/or change the curvature of the side articulating members). In one embodiment, the enclosure 101 includes two side articulating members disposed on opposing sides of the mouse 100. Movement of one or more of the side articulating members may change a width of the mouse 100. Side articulating members are discussed in more detail below, for example with respect to FIGS. 3A-3B.

The shape of the exterior surface of the enclosure 101 may be changed to improve ergonomics, to facilitate particular functions of an associated computing device, and/or to provide feedback to users.

In one embodiment, the contour of the exterior surface of the enclosure 101 is optimized to fit a user's hand. The mouse 100 may include various sensors for determining if the shape of the exterior surface matches a shape of the user's hand, and the shape of the mouse 100 may be changed accordingly. For example, one or more sensors may be used to determine whether the surface area of the enclosure 101 that a user's hand is in contact with exceeds a predetermined threshold. If the surface area that the user's hand is in contact with exceeds the threshold, the mouse or a connected computing device may determine that the shape of the enclosure 101 is optimized. If the surface area that the user's hand is in contact with does not exceed the threshold, the mouse or a connected computing device may determine that the shape of the enclosure 101 needs to be adjusted. A mouse with sensors for detecting a user's hand is discussed in more detail below with respect to FIGS. 16-18C.

In another embodiment, the shape of the exterior surface is optimized for a particular function or activity being performed at an associated computing device. For example, a relatively flat shape may be chosen for tasks that are typically performed on a trackpad and a curved shape may be chosen for tasks that are typically performed using a traditional mouse.

In another embodiment, the shape of the mouse 100 may be changed to provide feedback to a user of the mouse and/or an associated computing device. The shape of the mouse 100 may be changed in response to a change at a user interface of a computing device associated with the mouse 100. For example, the mouse may become larger as a user zooms in or enlarges an object and smaller when a user zooms out or reduces the size of an object. Examples of this functionality are provided in more detail below with respect to FIGS. 19-21.

In one embodiment, the articulating member forms at least a portion of the exterior surface (e.g., the top surface 102, the side surface 104, and so on). In another embodiment, a flexible membrane is disposed over the articulating member and forms at least a portion of the exterior surface. In one embodiment, the flexible membrane is disposed over the articulating member and one or more side articulating members to form a continuous surface across the enclosure 101. The flexible membrane may be formed of a flexible sheet, film, or other pliable or flexible material. Examples include fabric, polymer, leather, rubber, and so on. The top surface 102 and the side surfaces 104 may form distinct surfaces or they may form a continuous smooth surface. In another embodiment, the enclosure 101 forms a single continuous exterior surface.

The mouse 100 may be a device that can be manipulated by hand. Movement of the mouse can be interpreted as a command or input to the device. For example, the mouse may be translatable along a surface and include a sensor that tracks the movement. In one embodiment, the mouse 100 may be configured to detect motion along two axes, for example across a flat surface such as a desk, table or the like.

In other embodiments, the mouse 100 may be configured to detect motion along three axes, for example using an accelerometer. Movement tracked by the sensor may be used to control a cursor or position of a graphical element on a computer display.

In various embodiments, the mouse 100 is configured to receive inputs from a user. Inputs may include touch inputs, force inputs, clicks, gestures, movements, and so on. The mouse 100 includes one or more input devices (e.g., buttons, sensors, switches, accelerometers, click wheels, and the like) to detect and/or process inputs. In some cases, the mouse 100 includes a touch and/or force sensitive surface that is configured to receive touch and/or force inputs from the user.

The mouse 100 may be connected to one or more computing devices, including smart phones, tablets, laptops, personal computers, virtual reality equipment, and so on. The mouse 100 may include various components for facilitating wired and/or wireless communication with computing devices. In one embodiment, the mouse 100 includes a processor for detecting and processing inputs and facilitating shape changes of the mouse.

Figure 2A:
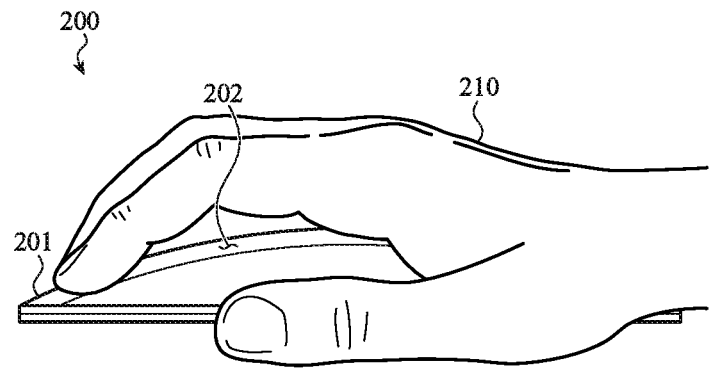
FIGS. 2A and 2B illustrate example curvatures of the mouse of FIG. 1.
Figure 2B:
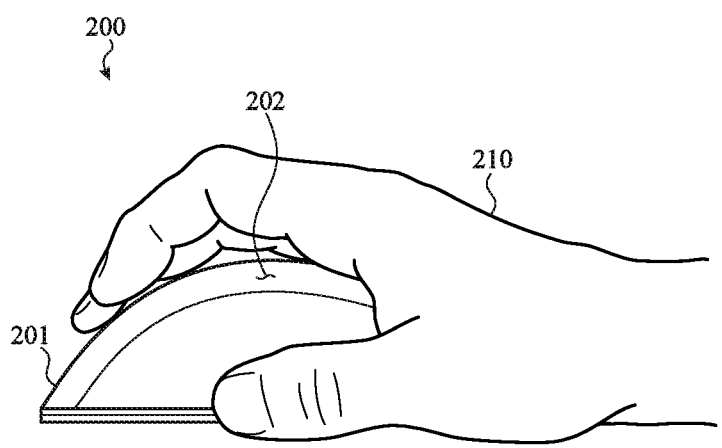

FIGS. 2A and 2B illustrate example different profile shapes of a top surface 202 of an enclosure 201 of a mouse 200, each profile shape having a different curvature. The mouse 200 is similar to the mouse described above with respect to FIG. 1, and may include similar components and/or features. One or more exterior surfaces (e.g., the top surface 202) of the enclosure 201 are configured to receive a hand 210 of a user, and may have a variable curvature. In one embodiment, the curvature of the exterior surface is based on a configuration of the articulating member. As discussed above with respect to FIG. 1, the articulating member is configurable to transition between different configurations that correspond to different curvatures. For example, the articulating member may be configured to transition between a first configuration and a second configuration.

FIG. 2A illustrates a first example curvature of the top surface 202 of the mouse 200 corresponding to a first configuration of the articulating member. In the example of FIG. 2A, the top surface 202 has a profile shape that is substantially flat. FIG. 2B illustrates a second example curvature of the top surface 202 of the mouse 200 corresponding to a second configuration of the articulating member. In the example of FIG. 2B, the top surface 202 has a profile shape that is curved, and has a greater radius of curvature than the top surface 202 in the example of FIG. 2A. As discussed above with respect to FIG. 1, the curvature of the enclosure 201 may be changed to improve ergonomics, to facilitate particular functions of an associated computing device, and/or to provide feedback to users.

Figure 3A:
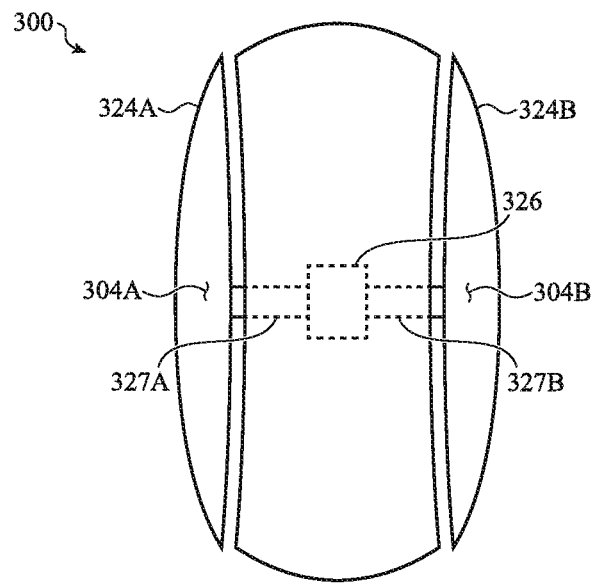
FIGS. 3A and 3B are top-down views of an example mouse.
Figure 3B:
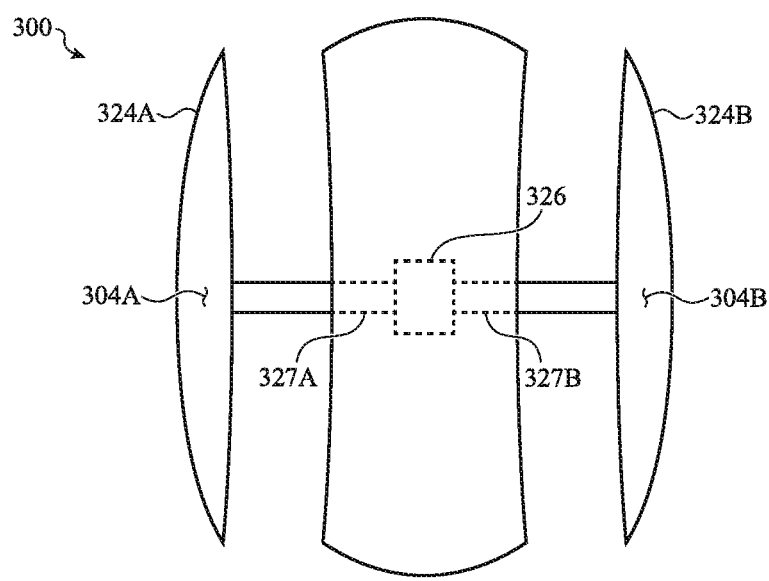

FIGS. 3A and 3B are top-down views of an example mouse 300. The example mouse 300 is similar to the mice 100, 200 described above with respect to FIGS. 1-2B, and may include similar components and/or features. As discussed above, the mouse may include one or more side articulating members (e.g., side articulating members 324A and 324B) that are configured to change a shape of the mouse. Side articulating members may be configured to interface with digits of a hand of a user, such as fingers or thumbs. For example, the first side articulating member 324A may be configured to receive a thumb of a user's hand and the second side articulating member 324B may be configured to receive a pinky or other finger of the user's hand. In some implementations, the side articulating members 324A and 324B are configured to receive touch and/or force input using a touch and/or force sensitive surface, one or more buttons, or other type of input device.

The side articulating members may be configured to move and/or change shape to change a shape of the enclosure of the mouse 300, for example by moving and/or changing a curvature of a side surface (e.g., side surfaces 304A and 304B) of the exterior surface of the mouse 300. The mouse 300 may include one or more actuators configured to transition the side articulating members between various configurations (e.g., to move and/or change the curvature of the side articulating members). FIG. 3A shows the mouse 300 in a first configuration having a first width (left to right with respect to FIG. 3A). FIG. 3B shows the mouse 300 in a second configuration having a second width that is greater than the first width. In this example, the width corresponds to a dimension that extends between the side surfaces defined by the side articulating members 324A and 324B. In various embodiments, the side articulating members may move separately from one another or together, and in the same or different directions.

In the embodiment of FIGS. 3A and 3B, the mouse 300 includes two side articulating members 324A and 324B disposed on opposing sides of the mouse and an actuator 326 disposed within the mouse configured to move the side articulating members. Movement of one or more of the side articulating members may change a width of the mouse 300 or otherwise change the shape of the mouse 300. Links 327A and 327B (also referred to herein as arms or connecting elements) may couple the side articulating members 324A and 324B to the actuator 326. In one embodiment the actuator 326 is a stepper motor, as described in more detail below with respect to FIGS. 7A and 7B.

In the various embodiments described herein, the described mouse components (e.g., the articulating members, the actuators, the top portions, and the like) are interchangeable with other described components and their equivalents. For example, a particular embodiment of an articulating member that is shown in a first figure is envisioned to function with an embodiment of an actuator shown in a second figure, and so on. FIGS. 4-15B illustrate examples of different mouse components, the particular combinations of which are examples only and are not meant to be limiting.

Figure 4:
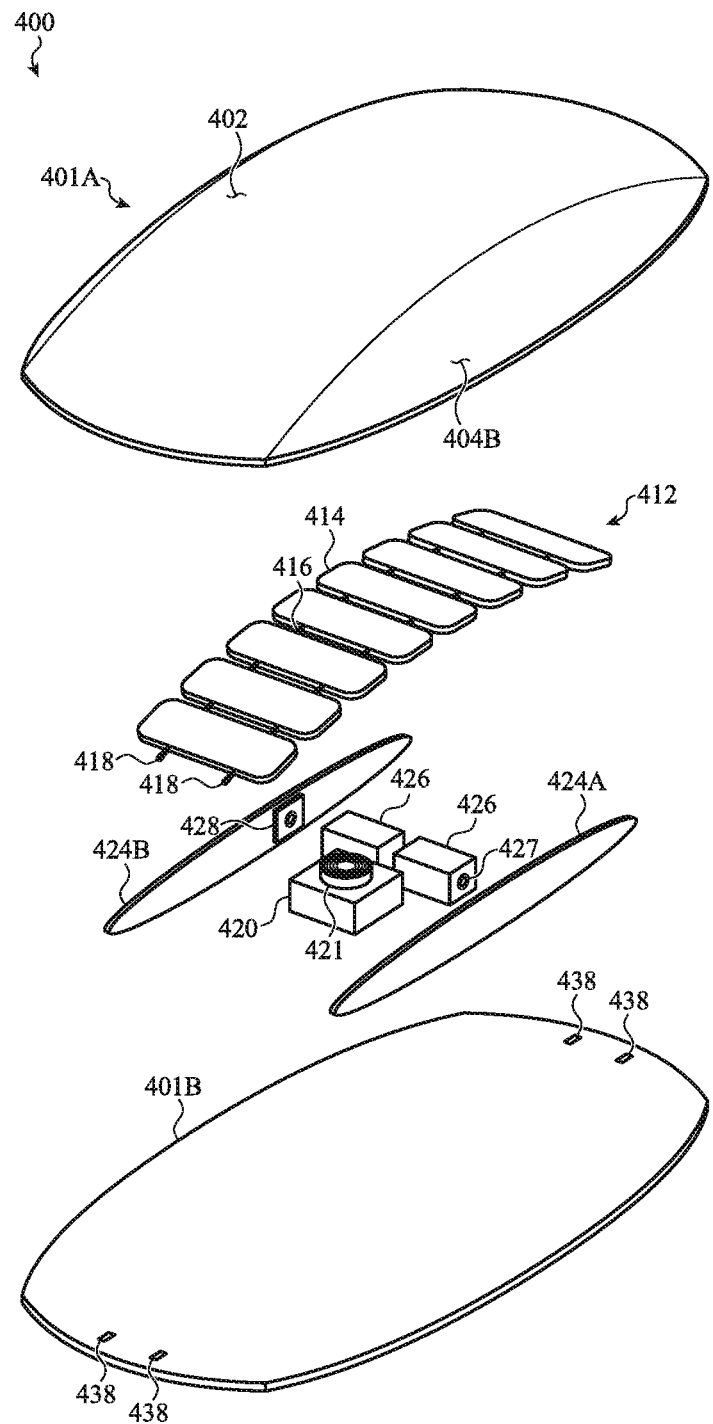
FIG. 4 is a schematic view of an example mouse that is configured to transition between different shapes.

FIG. 4 is a schematic view of an example mouse 400 that is configured to transition between different shapes. The example mouse 400 is similar to the mice (e.g., mice 100, 200, 300) described above with respect to FIGS. 1-3B, and may include similar components and/or features. The mouse 400 includes an enclosure 401 that includes a top portion 401A and a base portion 401B. The enclosure 401 defines an exterior surface that includes a top surface 402 and one or more side surfaces (e.g., side surfaces 404A and 404B). In one embodiment, an articulating member 412 is disposed below the top surface 402. The articulating member 412 is configured to move and/or change shape such that the profile shape or curvature of the top surface 402 changes. In one embodiment, an actuator 420 is configured to exert force on the articulating member 412, causing the articulating member to transition between various configurations.

The mouse 400 further includes side articulating members 424A and 424B that are configured to move and/or change shape. The side articulating members 424 are positioned within the enclosure such that they define a shape of the side surfaces 404. Similar to the articulating member 412, the movement of the side articulating members 424 changes the shape of the top portion 401A of the enclosure, for example by changing a position and/or curvature of the side surfaces 404. For example, the side articulating members 424 may be configured to move inward and outward as shown and described with respect to FIGS. 3A and 3B.

As noted above, the shape of the top portion 401A of the enclosure may vary based on the configurations of the articulating member 412 and/or the side articulating members 424. The articulating members 412, 424 are configured to transition between different configurations, thereby changing the shape or contour of the top portion 401A.

In the embodiment of FIG. 4, the articulating member 412 is a segmented array that includes segments 414. The segments 414 may be coupled by connectors 416. In one embodiment, the segments 414 are pivotally or hingedly coupled by the connectors 416 such that adjacent segments may move (e.g., pivot, rotate) relative to one another and change a curvature of the articulating member 412 and alter the profile shape of the mouse. In another embodiment, the segments 414 may be flexible such that the segments 414 may bend to change the curvature of the articulating member 412 to alter the profile shape of the mouse. The articulating member 412 may be configured to couple to the base portion 401B of the enclosure by coupling elements 418. In one embodiment, the coupling elements 418 interface with receptacles 438 of the base portion 401B.

Although the articulating member 412 is shown as an array of segments 414 in FIG. 4, in various embodiments, the articulating member may take a variety of forms. In one embodiment, the articulating member may include an array of overlapping segments configured to slide relative to each other as shown and described below with respect to FIGS. 8A and 8B. In another embodiment, the articulating member may be a flexible membrane that defines an exterior surface (e.g., a top surface and/or a side surface) of the enclosure as shown and described with respect to FIGS. 9A and 9B. In still another embodiment, the articulating member may include multiple layered members. The layered members may have a tunable stiffness, for example using layer jamming, as shown and described with respect to FIGS. 10A-B and 11A-B. In another embodiment, the articulating member may be a rigid, semi-rigid, or flexible member, for example as shown and described with respect to FIGS. 13A-B and 14A-B. In another embodiment, the articulating member may include segments connected by actuators, for example as shown and described with respect to FIGS. 15A and 15B.

Returning now to FIG. 4, the actuator 420 is disposed within the enclosure and configured to move (e.g., change a shape and/or a position of) the articulating member 412. The actuator 420 may be disposed on and/or coupled to the base portion 401B of the enclosure. In one embodiment, the actuator 420 is an actuator that includes a shaft 421 that interfaces with the articulating member 412, as shown and described in more detail with respect to FIGS. 5A and 5B. In another embodiment, the actuator is a spring as shown and described with respect to FIGS. 12A and 12B. In still another embodiment, the actuator includes an electromagnet, as shown and described with respect to FIGS. 13A-13B and 14A-14B. The mouse 400 may include multiple actuators for moving the articulating member, for example as described below with respect to FIGS. 9A-9B and 15A-15B.

Returning now to FIG. 4, the side articulating members are configured to move and/or change shape. The side articulating members 424 may be formed of any rigid, semi-rigid, and/or flexible material and may have a variety of shapes. The side articulating members 424 may include multiple components and may take similar forms to the articulating member 412.

The mouse 400 may include one or more side actuators 426 configured to move the side articulating members 424. The side actuators 426 may be disposed on and/or coupled to the base portion 401B of the enclosure. In the embodiment of FIG. 4, the side actuators 426 are linear actuators with shafts 427 that interface with receptacles 428 of the side actuating members 424. In various embodiments, the side actuators may take a different form from what is shown in FIG. 4. For example, the side actuators may take a similar form to the actuator, including springs, magnets, and the like. In one embodiment, a single side actuator controls the movement of both side articulating members. For example, the side actuator may be a stepper motor, as shown and described with respect to FIGS. 7A and 7B.

In the example of FIG. 4, the mouse 400 includes three actuators 420, 426. In various embodiments, more or fewer actuators may be used. In one embodiment, a single actuator is configured to move the articulating member 412 and the side articulating members 424. In another embodiment, one actuator is configured to move the articulating member 412, and another actuator is configured to move the side articulating members 424.

The mouse 400 may include various input mechanisms for receiving inputs from users. For example, the mouse 400 may include buttons, click wheels, sensors, and the like. In one embodiment, the articulating member 412 and/or the side articulating members 424 are configured to receive inputs, for example as touch inputs or force inputs. In various embodiments, the articulating members 412, 424 may be configured to provide tactile feedback in response to receiving user inputs. For example, a side articulating member 424 may be configured to move in response to an input.

Figure 5A:
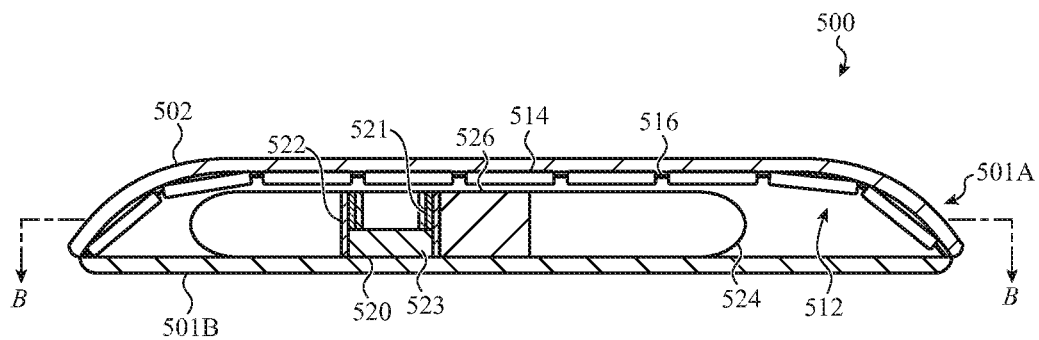
FIGS. 5A and 5B illustrate cross-section views of an example mouse, taken through section A-A of FIG. 1.
Figure 5B:
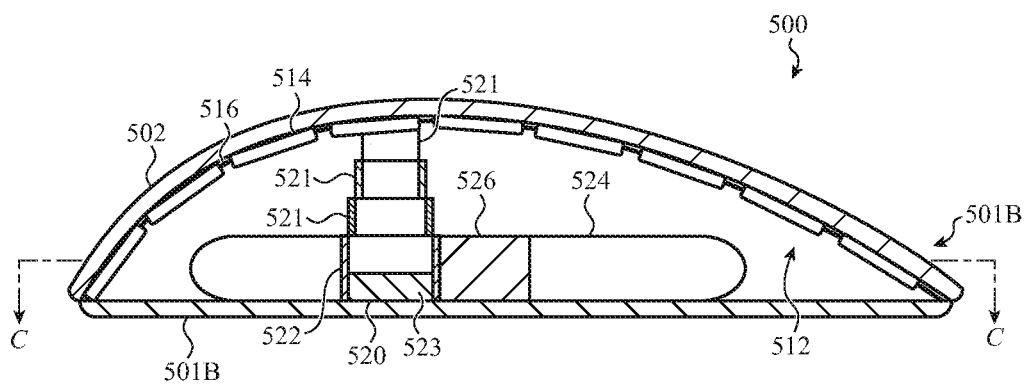

FIGS. 5A and 5B illustrate cross-section views of an example mouse 500, taken through section A-A of FIG. 1. The mouse 500 is similar to other embodiments described herein, and may include similar components and/or features. For example, the mouse 500 includes an enclosure comprising a top portion 501A and a base portion 501B. The mouse 500 includes an actuator 520 configured to move an articulating member 512. The articulating member 512 may include segments 514 coupled by connectors 516 similar to those described above with respect to FIG. 4.

In one embodiment, the actuator 520 is a telescopic cylinder linear actuator, and the shaft 521 is a telescoping shaft. The shaft 521 is configured to move between a retracted position and an extended position. FIG. 5A shows the telescoping shaft in the retracted position. The articulating member 512 is in a first configuration, resulting in at least a portion of the top surface 502 of the top portion 501A of the enclosure being substantially flat. FIG. 5B shows the telescoping shaft in the extended position. The articulating member 512 is in a second configuration, resulting in at least a portion of the top surface 502 being curved. The shafts may also be positioned in various positions between the retracted position and the extended position, corresponding to additional configurations of the articulating member and profile shapes or curvatures of the top surface.

Telescoping actuators provide various advantages. The extended length of the actuator may be much greater than the un-extended length of the actuator. This allows the mouse to maintain a relatively slim thickness when the actuator is retracted compared to the thickness when the actuator is extended.

Although a telescopic cylinder linear actuator is shown in FIGS. 5A and 5B, the actuator 520 may take a variety of forms. For example, the actuator 520 may be a helical band actuator, a rigid belt actuator, a rigid chain actuator, a segmented spindle, a mechanical actuator, a hydraulic actuator, a pneumatic actuator, a piezoelectric actuator, an electromechanical actuator, a spring, and so on. In various embodiments, the mouse may include multiple actuators.

The actuator 520 includes a drive mechanism 523 for controlling the actuator 520. The drive mechanism 523 may be a rotary motor, a linear motor, a stepper motor, a hydraulic pump, an air compressor, a manual drive, or the like. The actuator 520 further includes an actuator housing 522 that contains actuator components. In various embodiments, the actuator housing 522 is configured to be coupled or otherwise attached to the base portion or other components of the mouse 500.

The mouse 500 may further include one or more side articulating members 524 and one or more side actuators 526 configured to move the side articulating members 524 as discussed above. The top portion 501A of the enclosure may include a flexible membrane disposed over the articulating member 512 and/or the side articulating members 524. In one embodiment, the flexible membrane is disposed over the articulating member and one or more side articulating members to form a continuous surface across the top portion 501A. The flexible membrane may be formed of a flexible sheet, film, or other pliable or flexible material. Examples include fabric, polymer, leather, rubber, and so on. The top surface 502 and the side surfaces may form distinct surfaces or they may form a continuous smooth surface. In another embodiment, the top portion 501A forms a single continuous exterior surface.

Figure 6A:
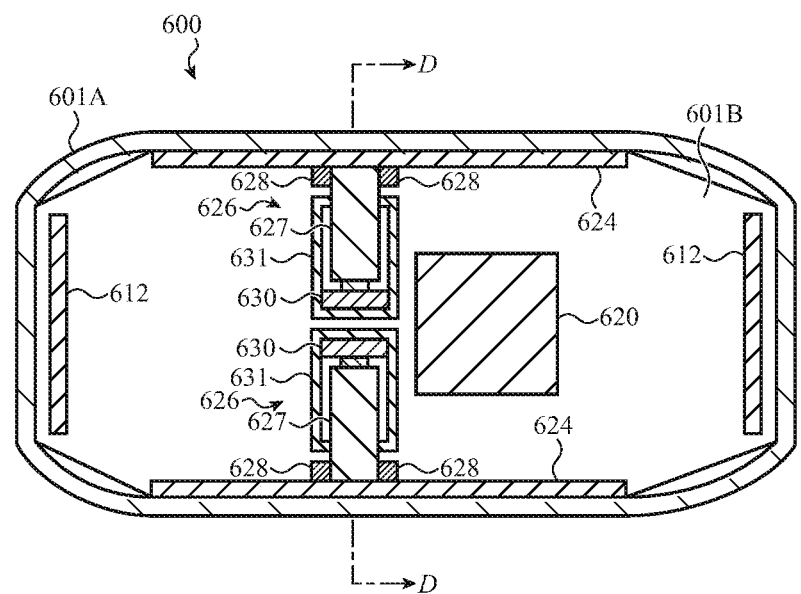
FIGS. 6A and 6B illustrate cross-section views of an example mouse, taken through sections B-B and C-C of FIGS. 5A and 5B, respectively.
Figure 6B:
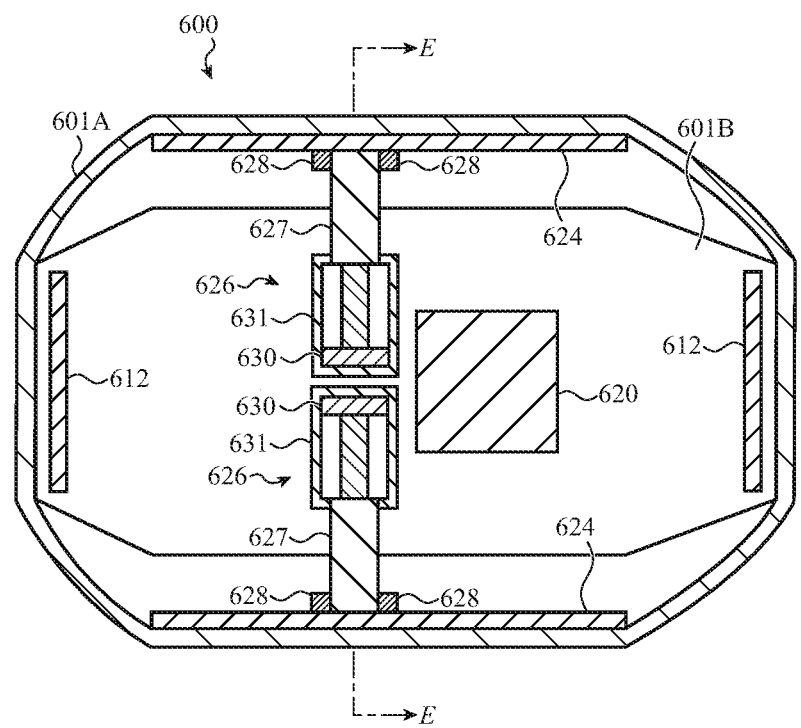

A mouse may further include one or more side actuators that are configured to move one or more side articulating members. FIGS. 6A and 6B illustrate cross-section views of an example mouse 600, taken through sections B-B and C-C of FIGS. 5A and 5B, respectively. The example mouse 600 is similar to the mice (e.g., mice 100, 200, 300, 400, 500) described above with respect to FIGS. 1-5B, and may include similar components and/or features. For example, FIGS. 6A and 6B show an articulating member 612, an actuator 620, actuators 626, and an enclosure including a top portion 601A and a base portion 601B, which are similar to others described herein.

As shown in FIGS. 6A and 6B, in one embodiment, actuators 626 are linear actuators that are configured to move between a retracted position and an extended position, thereby moving one or more side articulating members 624. In one embodiment, the linear actuators include links 627 (also referred to herein as shafts or connecting elements) at least partially disposed in actuator housings 631. The links 627 may be configured to interface with receptacles 628 of the side articulating members 624.

FIG. 6A shows the links 627 in the retracted position. In FIG. 6A, the articulating members 624 are in a first configuration, and the mouse 600 has a first width (e.g., as measured from top to bottom with respect to FIG. 6A). FIG. 6B shows the links 627 in the extended position. In FIG. 6B, the articulating members 624 are in a second configuration, and the mouse 600 has a second width that is greater than the first width. The links may also be positioned in various positions between the retracted position and the extended position. Further, movement of the side articulating members 624 may change a shape of the mouse in other ways. For example, as shown in FIG. 6B, the second configuration of the side articulating member 624 causes the top portion 601A of the enclosure to change shape.

The side articulating members 624 are shown as rigid members in the example of FIGS. 6A-6B. However, in various embodiments, the side articulating members 624 may take a variety of forms. For example, the side articulating members 624 may be flexible such that they are curved when the actuators are extended. As another example, the side articulating members 624 may include multiple segments similar to the articulating member 612.

In various embodiments, the actuators 620, 626 are configured to be controlled separately from one another. For example, the actuators 626 may both be extended while the actuator 620 remains un-extended to create a wide, flat surface on the top portion 601A. As another example, the actuators 626 may move independently of one another to make just one side of the mouse change shape. In various embodiments, the actuator housings 631 are configured to be coupled or otherwise attached to the base portion 601B or other components of the mouse 600. The actuators 626 further include drive mechanisms 630 for controlling the actuators. The drive mechanisms 630 may be rotary motors, linear motors, stepper motors, hydraulic pumps, air compressors, manual drives, or the like.

Figure 7A:
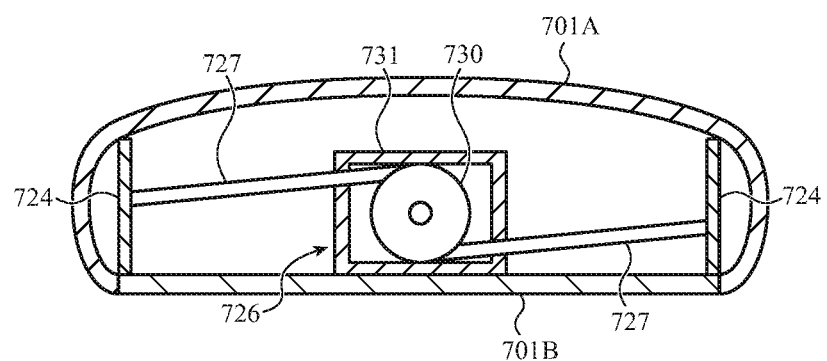
FIGS. 7A and 7B illustrate cross-section views of an example mouse, taken through sections D-D and E-E of FIGS. 6A and 6B, respectively.
Figure 7B:
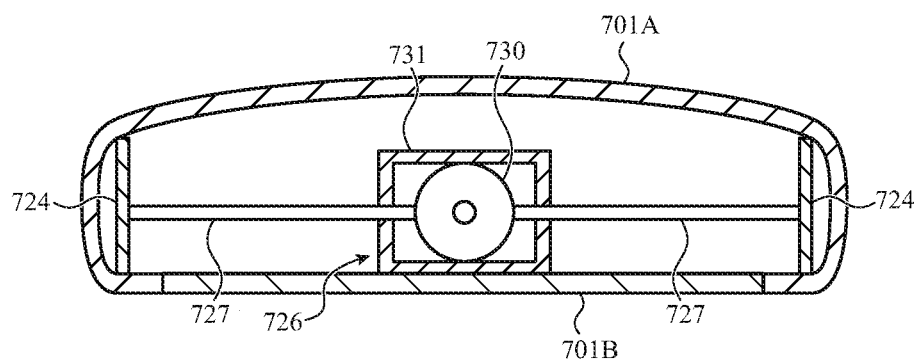

FIGS. 7A and 7B illustrate cross-section views of an example mouse 700, taken through sections D-D and E-E of FIGS. 6A and 6B, respectively depicting an alternative drive mechanism. The example mouse 700 is similar to the mice (e.g., mice 100, 200, 300, 400, 500, 600) described above with respect to FIGS. 1-6B, and may include similar components and/or features. For example, the mouse 700 includes an enclosure with a top portion 701A and a base portion 701B, side articulating members 724, and additional components that are not shown, which are similar to others described herein.

The mouse 700 further includes an actuator 726 disposed in the enclosure and configured to move the side articulating members 724. The actuator 726 includes a drive mechanism 730 configured to move arms 727 (also referred to herein as links or connecting elements). The arms 727 are configured to interface with the side articulating members 724. In one embodiment, the drive mechanism 730 is a rotary motor, such as a stepper motor.

As shown in FIGS. 7A and 7B, the arms 727 are coupled to the motor such that rotation of the motor causes the arms to extend and retract, thereby moving the side articulating members 724. In FIG. 7A, the side articulating members 724 are shown in a first configuration that corresponds to a first shape of the enclosure of the mouse 700. In FIG. 7B, the side articulating members 724 are shown in a second configuration that corresponds to a second shape of the enclosure of the mouse 700. The actuator 726 further includes an actuator housing 731 that is configured to be coupled with or otherwise disposed in the enclosure.

Figure 8A:
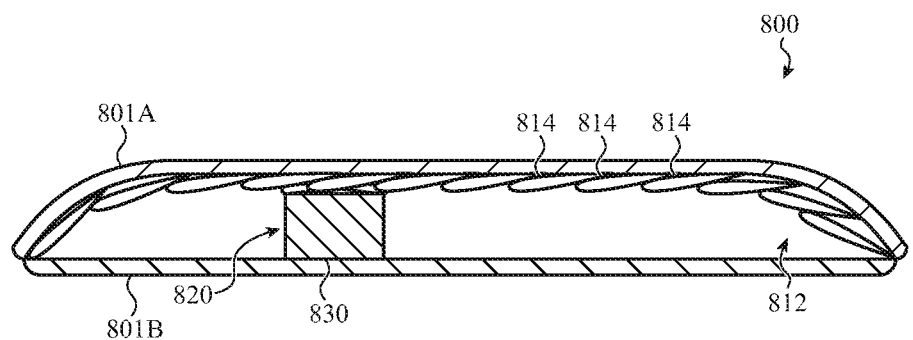
FIGS. 8A and 8B illustrate cross-section views of an example mouse, according to an embodiment.
Figure 8B:
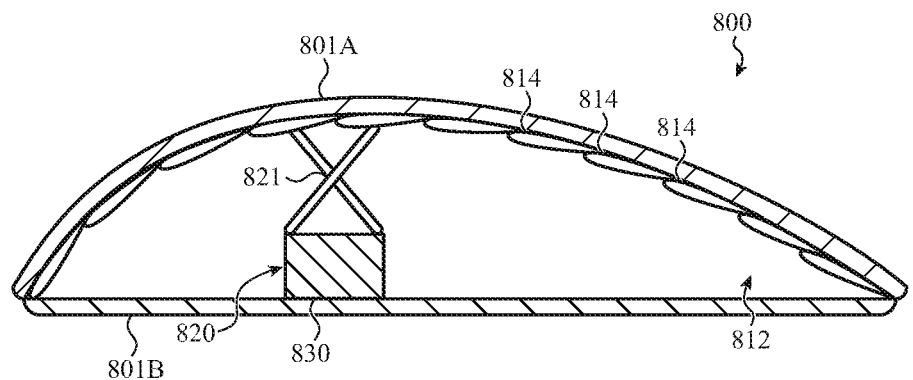

FIGS. 8A and 8B illustrate cross-section views of an example mouse 800. The mouse 800 is similar to other embodiments described herein, and may include similar components. For example, the mouse 800 includes an enclosure comprising a top portion 801A and a base portion 801B similar to those described herein. The mouse 800 includes an articulating member 812 that includes overlapping segments 814. The segments 814 are configured to slide or otherwise move relative to one another as the articulating member 812 moves and/or changes shape.

The mouse 800 further includes an actuator 820 that is configured to move the articulating member 812. The actuator 820 includes scissored arms 821 that are configured to move between an extended position and a retracted position. FIG. 8A shows the scissored arms in the retracted position, and FIG. 8B shows the scissored arms in the extended position. The actuator 820 may include one or more drive mechanisms 830 as discussed above for moving the scissored arms between positions.

Figure 9A:
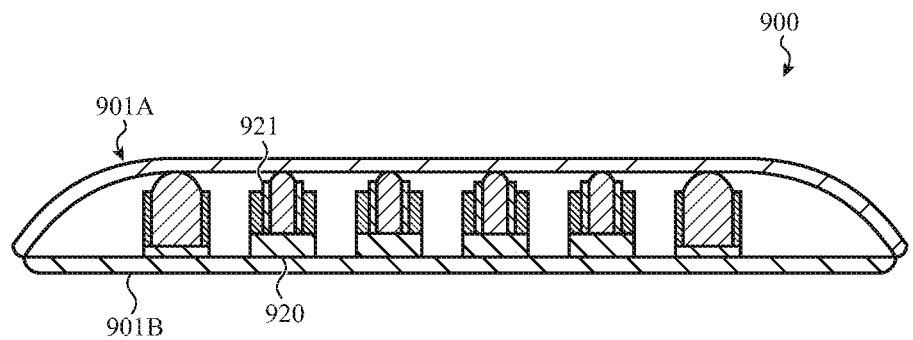
FIGS. 9A and 9B illustrate cross-section views of an example mouse, according to an embodiment.
Figure 9B:
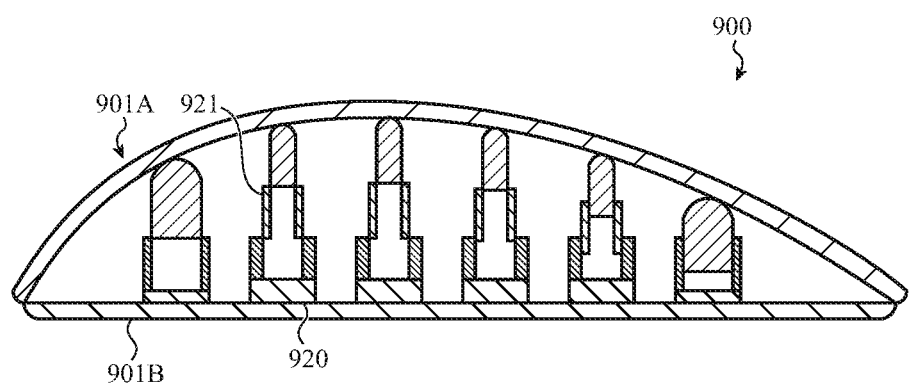

FIGS. 9A and 9B illustrate cross-section views of an example mouse 900. The mouse 900 is similar to other embodiments described herein, and may include similar components. For example, the mouse 900 includes an enclosure comprising a top portion 901A and a base portion 901B similar to those described herein. In the embodiment of FIGS. 9A and 9B, the articulating member is integrated with the top portion 901A. The mouse 900 includes multiple actuators 920 for changing the shape of the top portion 901A. In the example of FIG. 9, the actuators 920 are telescopic actuators that are disposed on the base portion 906. The actuators 920 include telescoping shafts 921 that are configured to move between an extended position and a retracted position.

FIG. 9A shows the telescoping shafts in the retracted position, and FIG. 9B shows the telescoping shafts in the extended position. The actuators 920 may include one or more drive mechanisms as discussed above for moving the telescoping shafts between positions. In various embodiments the actuators 920 may be positioned at various locations on the base portion 906 such that the actuator shafts form a structure and define a contour of the top portion 901A.

Figure 10A:
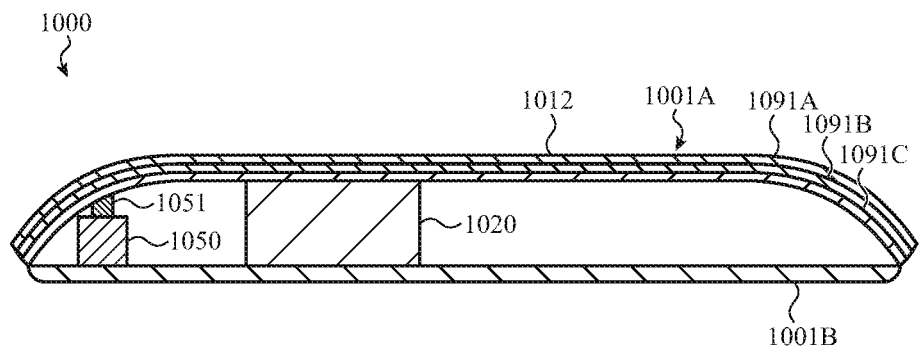
FIGS. 10A and 10B illustrate cross-section views of an example mouse, according to an embodiment.
Figure 10B:
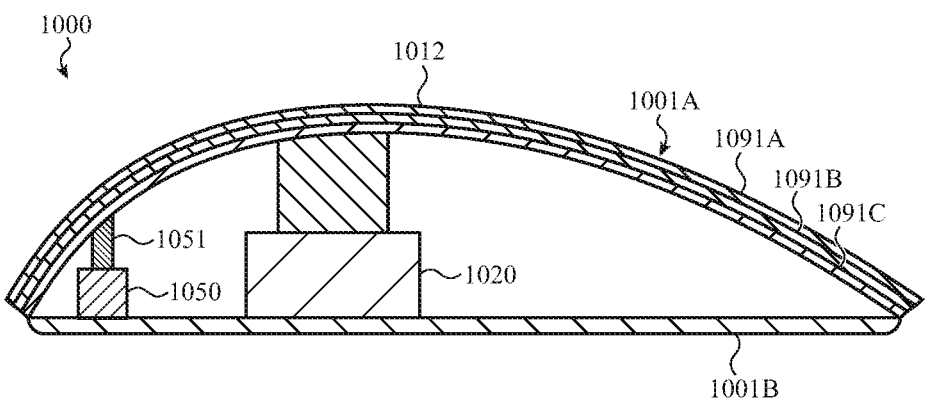

FIGS. 10A and 10B illustrate cross-section views of an example mouse 1000. The mouse 1000 is similar to other embodiments described herein, and may include similar components. For example, the mouse 1000 includes an actuator 1020, an enclosure comprising a top portion 1001A and a base portion 1001B similar to those described herein. The top portion 1001A of the mouse 1000 includes an articulating member 1012 formed of stacked layers 1091A, 1091B, and 1091C. In one embodiment, the articulating member 1012 has a variable or tunable stiffness.

Figure 11A:
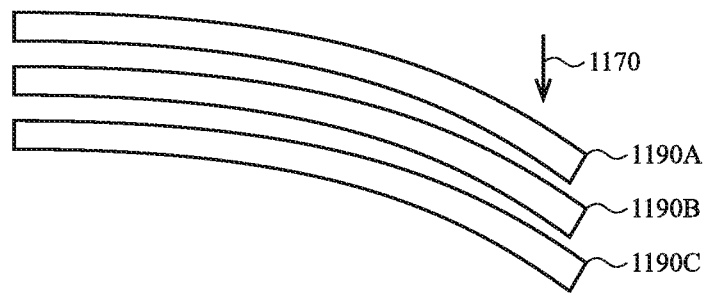
FIGS. 11A and 11B illustrate example layers in different states corresponding to varying stiffness.
Figure 11B:
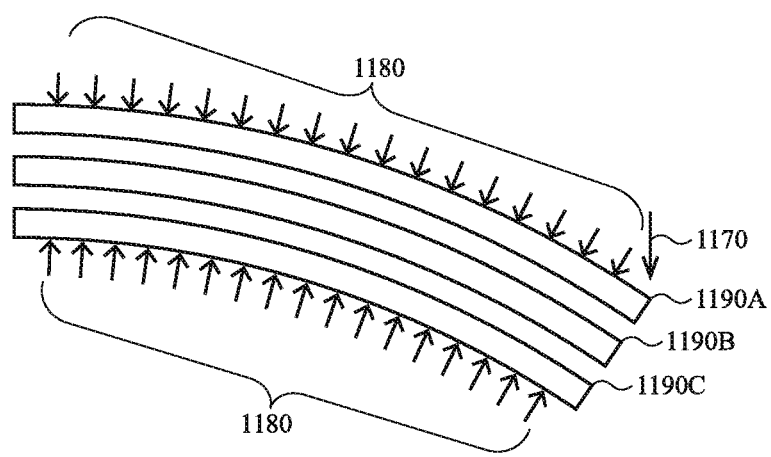

In one embodiment, the tunable stiffness is achieved using layer jamming, in which the layers 1091 form a tunable articulating member 1012 with multiple states corresponding to varying stiffness. In one embodiment, the tunable articulating member has a free state and a jammed state. In some cases, a jammed state or jamming the stack of layers refers to a state in which a normal force is applied between two or more adjacent stacked layers to increase the friction or resistance to shear between the two layers. FIGS. 11A and 11B illustrate example layers 1190 in different states corresponding to varying stiffness. FIG. 11A corresponds to a free state, and FIG. 11B corresponds to a jammed state.

In the free state shown in FIG. 11A, the layers 1190 may move in shear relative to one another (e.g., slide relative to one another) responsive to a force 1170 being applied to the layers. In the jammed state shown in FIG. 11B, a jamming mechanism prevents the layers from moving in shear in response to the force. For example, the jamming mechanism may result in a normal force 1180 that compresses the layers together, thereby increasing the friction between the layers and not allowing the layers to move in shear relative to one another. As a result, the bending stiffness of the tunable articulating member formed by the layers is greater in the jammed state than in the free state.

In one embodiment, the bending stiffness in the jammed state is proportional to the square of the number of layers of the tunable articulating member. For example, if the tunable articulating member has three layers, it is nine times stiffer in the jammed state than in the free state. If the tunable articulating member has ten layers, it is one hundred times stiffer in the jammed state than in the free state.

The jamming mechanism may be a vacuum pump, piston, or other mechanism capable of applying a vacuum between the layers. In the current example, the jamming mechanism includes a pump 1050 operably coupled to the tunable articulating member (for example by a connector 1051). In another embodiment, the jamming mechanism is integrated with the layers themselves. For example, in some cases, the jamming is performed using electroactive layers such as electroactive polymer layers. The size and/or shape of the layers may be adjusted based on the introduction of electrical current and/or an electric field, resulting in the layers transitioning between states. In one embodiment, the tunable articulating member is in the jammed state when no electrical field and/or current are present, and in the free state when an electrical field and/or current are present. In another embodiment, the tunable articulating member is in the free state when no electrical field and/or current are present, and in the jammed state when an electrical field and/or current are present.

The layers 1091 may be formed of a flexible material, such as fabric, polymer, leather, rubber, polycarbonate, acrylonitrile butadiene styrene (ABS), polyethylene terephthalate (PET), silicone, aluminum, steel, and so on. In the embodiment of FIGS. 10A and 10B, three layers 1091 are shown. In various embodiments, the top portion 1001A may include more or fewer layers 1091.

The state of the tunable articulating member 1012 may be changed to facilitate moving the articulating member between different configurations that correspond to a desired profile shape or curvature of the exterior surface of the mouse 1000. For example, the tunable articulating member 1012 may be in a jammed state during normal use of the mouse 100 to provide a stiff exterior surface similar to that of traditional mice. In one embodiment, when the tunable articulating member 1012 is moved from a first configuration (e.g., the configuration shown in FIG. 10A) to a second configuration (e.g., the configuration shown in FIG. 10B), the layers transition to the free state (e.g., the layers are "unjammed"). As a result, the tunable articulating member 1012 is more flexible and may be moved from the first configuration to the second configuration, for example by the actuator 1020. Once the articulating member 1012 is in the second configuration, the layers transition to the jammed state (e.g., the layers are jammed), thereby increasing the stiffness of the exterior surface of the mouse 1000, for example to prepare the mouse for normal use.

Figure 12A:
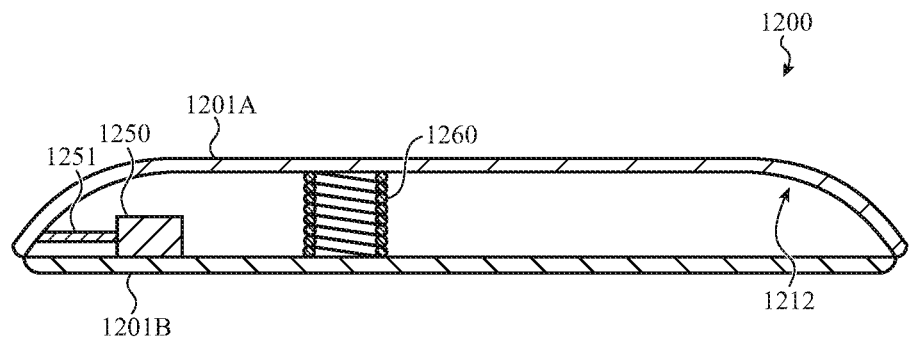
FIGS. 12A and 12B illustrate cross-section views of an example mouse, according to an embodiment.
Figure 12B:
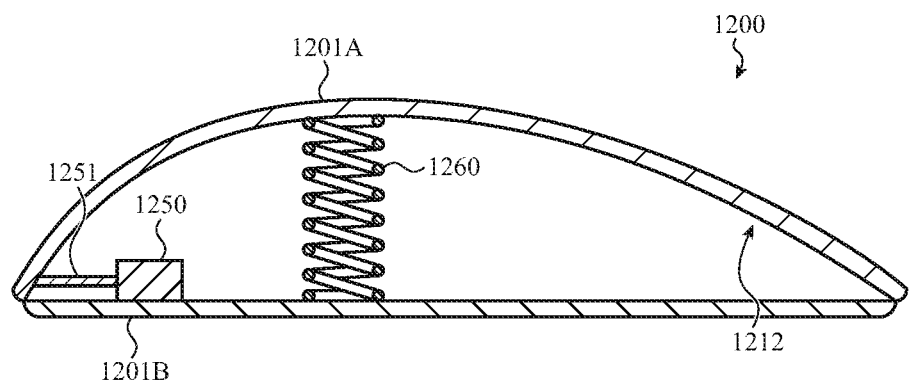

FIGS. 12A and 12B illustrate cross-section views of an example mouse 1200. The mouse 1200 is similar to other embodiments described herein, and may include similar components. For example, the mouse includes an enclosure comprising a top portion 1201A and a base portion 1201B similar to those described herein. The top portion 1201A of the mouse 1200 includes an articulating member 1212. In one embodiment, the articulating member 1212 has a variable or tunable stiffness as described above with respect to FIGS. 10A-11B. Returning to FIGS. 12A and 12B, the mouse 1200 includes a pump 1250 operably connected to the articulating member 1212 (for example by a connector 1251). The mouse 1200 further includes a spring 1260 configured to move the articulating member 1212. In one example embodiment, the spring is configured to move the articulating member from a first configuration (e.g., the configuration of FIG. 12A) to a second configuration (e.g., the configuration of FIG. 12B). In one embodiment, the mouse 1200 is capable of maintaining the configuration shown in FIG. 12A when the articulating member is in a jammed state. To initiate the movement of the articulating member to the configuration of FIG. 12B, the layers transition to the free state (e.g., the layers are "unjammed"). As a result, the tunable articulating member 1212 is more flexible and may be moved from the first configuration to the second configuration, by the spring 1260. Once the articulating member 1212 is in the second configuration, the layers transition to the jammed state (e.g., the layers are jammed), thereby increasing the stiffness of the exterior surface of the mouse 1200, for example to prepare the mouse for normal use. In one embodiment, the layers may be unjammed, and a downward force applied to the top portion of the mouse (e.g., by a user pressing on the mouse) to restore the mouse to the first configuration shown in FIG. 12A.

Figure 13A:
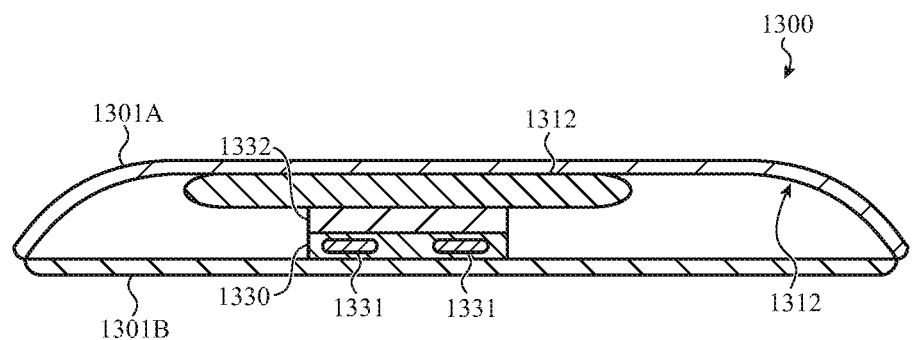
FIGS. 13A and 13B illustrate cross-section views of an example mouse, according to an embodiment.
Figure 13B:
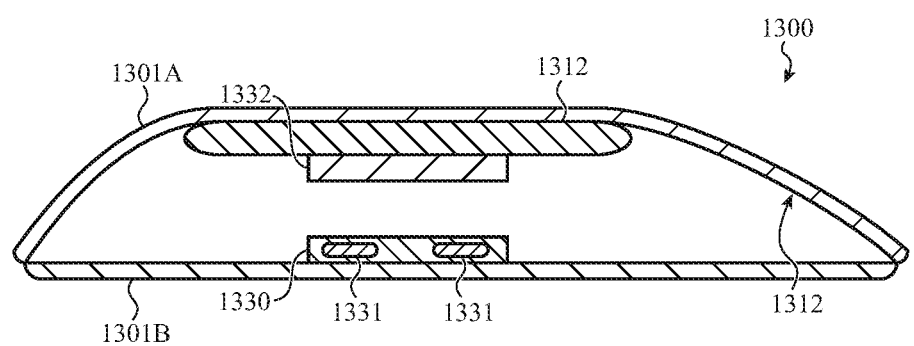

FIGS. 13A and 13B illustrate cross-section views of an example mouse 1300. The mouse 1300 is similar to other embodiments described herein, and may include similar components. The mouse includes an enclosure with a top portion 1301A and a base portion 1301B similar to those described herein. The mouse 1300 includes an articulating member 1312. The articulating member 1312 is a single rigid or semi-rigid member. The mouse 1300 further includes a magnetic element 1332 coupled to the articulating member 1312 and an electromagnet 1330 disposed on a base portion 1306.

In various embodiments, the magnetic element 1332 includes a magnetized or ferromagnetic material capable of experiencing a magnetic force in a magnetic field. Example materials that may be included in the magnetic element are iron, nickel, cobalt, their alloys (including steel), and the like.

The electromagnet 1330 includes a coil 1331 that is configured to generate a magnetic field when current flows through it. In a first configuration shown in FIG. 13A, there is no current, and therefore no magnetic force generated by the electromagnet 1330. Accordingly, the magnetic element 1332 rests on the electromagnet 1330. In a second configuration shown in FIG. 10B, a current is applied to the coil 1331, which generates a magnetic field. The magnetic field acts on the magnetic element 1332 and creates a repulsive force between the magnetic element 1332 and the electromagnet 1330. As a result, the magnetic element 1332 moves away from the electromagnet 1330. This causes the articulating member 1312 to move and changes the profile shape or curvature of the top surface of the mouse 1300.

Figure 14A:
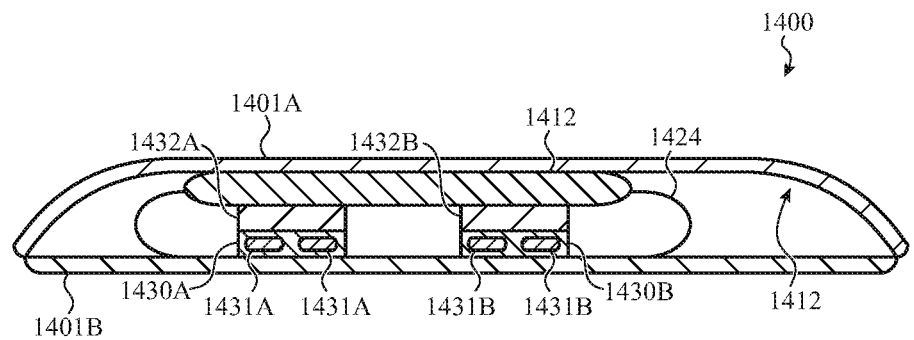
FIGS. 14A and 14B illustrate cross-section views of an example mouse, according to an embodiment.
Figure 14B:
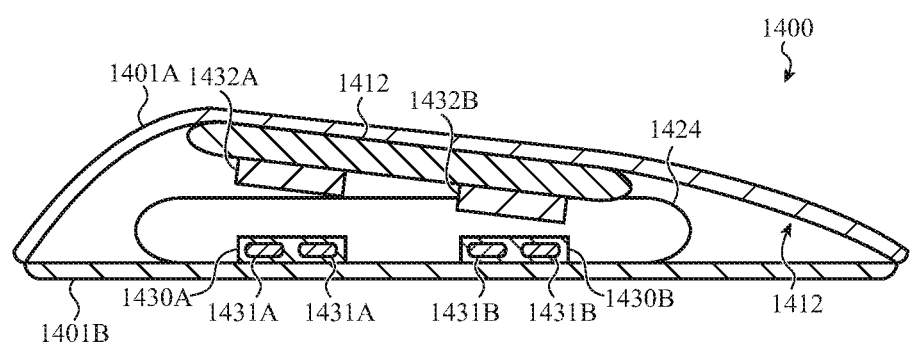

In various embodiments, multiple magnets and electromagnets may be used. FIGS. 14A and 14B illustrate cross-section views of an example mouse 1400. The mouse 1400 is similar to other embodiments described herein, and may include similar components. The mouse includes an enclosure with a top portion 1401A and a base portion 1401B similar to those described herein. The mouse 1400 includes two magnetic elements 1432A and 1432B and two electromagnets 1430A and 1430B.

As discussed above, in various embodiments, the magnetic elements 1432 include a magnetized or ferromagnetic material capable of experiencing a magnetic force in a magnetic field. Example materials that may be included in the magnetic element are iron, nickel, cobalt, their alloys (including steel), and the like.

Each electromagnet includes a coil 1431 that is configured to generate a magnetic field when current flows through it. In various embodiments, different magnetic fields can be generated by each electromagnet 1430 to exert different forces on the articulating member 1412. For example, in FIG. 14B, more current is applied to the coil 1431A than the coil 1431B, which results in a stronger magnetic field generated by the electromagnet 1430A. As a result, the left side (with respect to FIG. 14B) of the articulating member 1412 is higher than the right side.

Figure 15A:
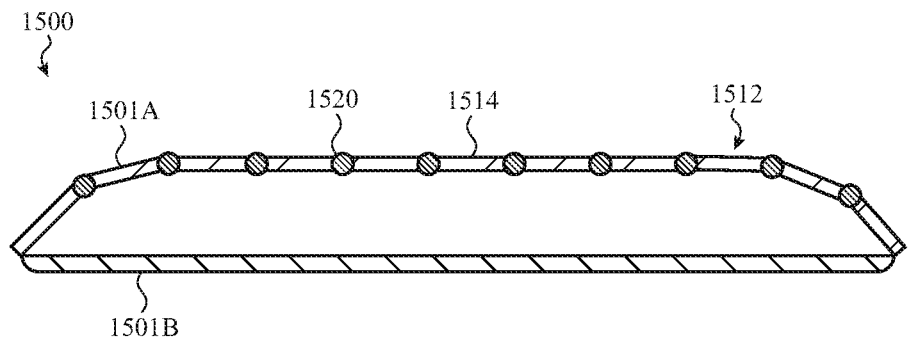
FIGS. 15A and 15B illustrate cross-section views of an example mouse, according to an embodiment.
Figure 15B:
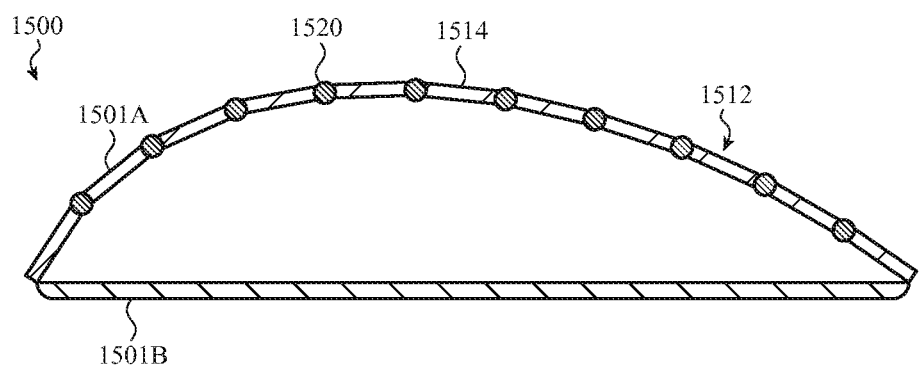

FIGS. 15A and 15B illustrate cross-section views of an example mouse 1500. The mouse 1500 is similar to other embodiments described herein, and may include similar components. The mouse includes an enclosure with a top portion 1501A and a base portion 1501B similar to those described herein. The top portion 1501A includes a segmented articulating member 1512 that includes drive members 1520 and rigid segments 1514. The drive members 1520 are configured to couple the segments 1514 and to change an angle between the segments 1514, thereby changing a curvature of the articulating member 1512. In one embodiment the drive members are motors. In another embodiment, the drive members are coupled to a motor and configured to change the curvature of the articulating member 1512.

Figure 16:
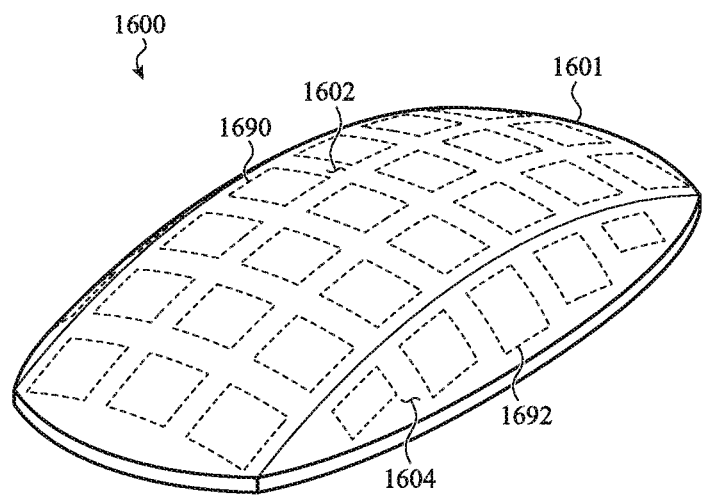
FIG. 16 illustrates an example mouse that includes sensors for detecting a hand, according to an embodiment.

FIG. 16 illustrates an example mouse 1600 that includes sensors for detecting a hand, according to an embodiment. The mouse 1600 is similar to other embodiments described herein, and may include similar components. The mouse includes an enclosure with a top portion 1601. The top portion 1601 includes one or more sensors 1690 disposed beneath a top surface 1602 and one or more sensors 1692 disposed beneath a side surface 1604.

In one embodiment, the sensors 1690, 1692 are configured to detect whether a hand is contacting the associated surface. The sensors may be capacitive sensors that detect changes in capacitance when a hand is in contact with an area of the surface near the sensor. The sensors may be arranged in an array such that outputs of the sensors can be used to determine how much of the surface is being contacted by a hand. In various embodiments, the sensor data is used to determine whether to change the shape of the mouse 1600 as discussed herein, for example to increase the amount of the surface that is being contacted by a hand and/or optimize the ergonomics of the mouse. In various embodiments, the sensors 1690, 1692 may be used to receive inputs (e.g., touch inputs).

Figure 17A:
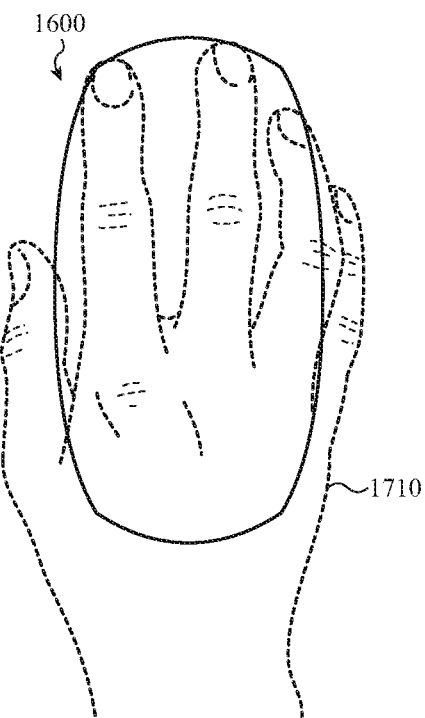
FIGS. 17A-C are diagrams showing different amounts of a user's hand contacting an exterior surface of a mouse.
Figure 17B:
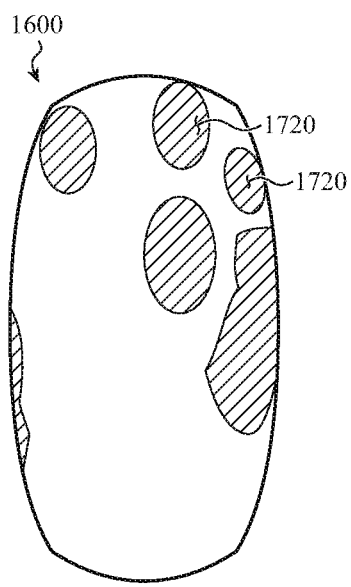
Figure 17C:
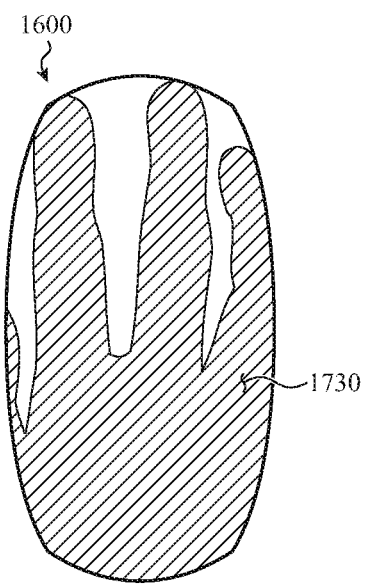

FIGS. 17A-C are diagrams showing different amounts of a user's hand contacting an exterior surface of the mouse 1600. FIG. 17A shows an example position of a user's hand 1710 relative to the mouse 1600. FIG. 17B illustrates a first detected condition showing sensed regions 1720 that correspond to areas of the surface of the mouse 1600 that is being contacted by the hand. FIG. 17C illustrates a second detected condition showing sensed region 1730 that corresponds to an area of the surface of the mouse 1600 that is being contacted by the hand. As shown in FIGS. 17B and 17C, the second detected condition indicates that more of the surface of the mouse 1600 is being contacted by the hand than the first detected condition.

In one embodiment, the sensors 1690, 1692 may be used to determine whether the surface area of the mouse (e.g., the top surface 1602) that a user's hand is in contact with exceeds a predetermined threshold. If the surface area that the user's hand is in contact with exceeds the threshold, the mouse or a connected computing device may determine that the contour of the top portion 1601 is optimized. For example, the second detected condition of FIG. 17C may indicate that the area exceeds the threshold. If the surface area that the user's hand is in contact with does not meet or exceed the threshold, the mouse or a connected computing device may determine that the contour of the top portion 1601 needs to be adjusted. For example, the second detected condition of FIG. 17C may indicate that the area does not meet or exceed the threshold.

In various embodiments, the shape of the mouse may be changed to fit a hand in a variety of ways. For example, sensors (e.g., sensors 1690, 1692) may detect contact at certain locations on the surface of the mouse and, in response, the shape of the mouse may be changed to a predetermined shape. As another example, the shape of the mouse may be set by a user or chosen from a predetermined set of mouse shapes, for example using an associated computing device.

Figure 18C:
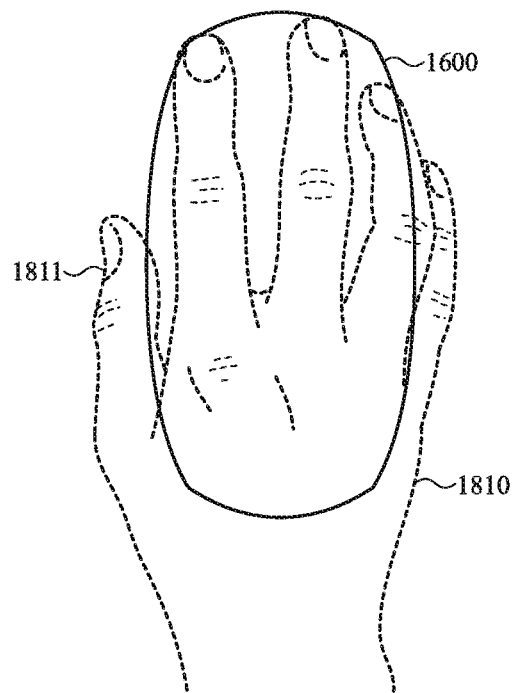
Figure 18C:
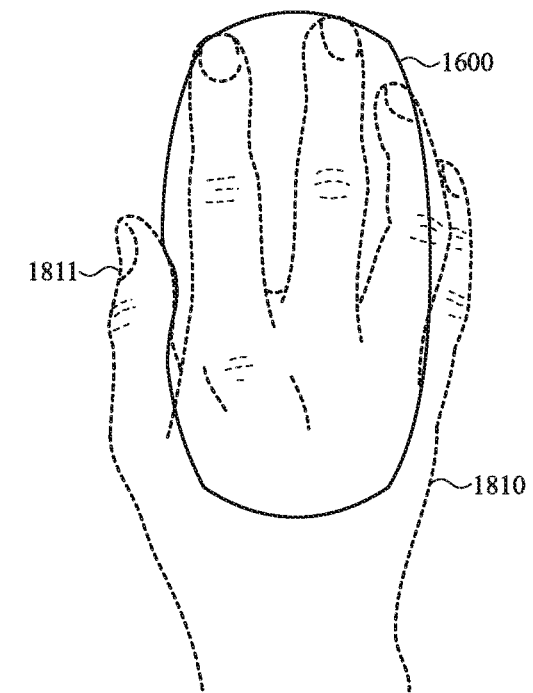
Figure 18C:
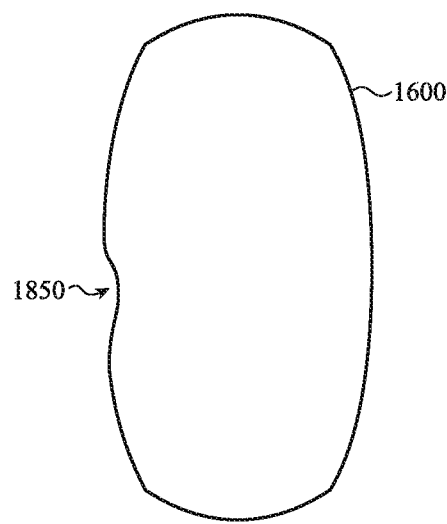

FIGS. 18A-18C are diagrams showing a shape of the mouse 1600 changing responsive to detecting a user's digit (e.g., thumb or finger) at a position on the surface of the mouse. In one embodiment, the sensors discussed with respect to FIG. 16 may be used to determine where a part of a user's hand (e.g., a digit) is on the exterior surface of the mouse. In response to detecting the position, the shape of the mouse 1600 may be changed. FIG. 18A illustrates a hand 1810 positioned on the mouse 1600. The sensors may detect the position of the user's thumb 1811 and adjust the shape of the mouse 1600 to accommodate the thumb as shown in FIG. 18B. FIG. 18C illustrates the mouse 1600 in the configuration of FIG. 18B without the hand 1810, and illustrates a contour 1850 configured to interface with the user's thumb.

Figure 19:
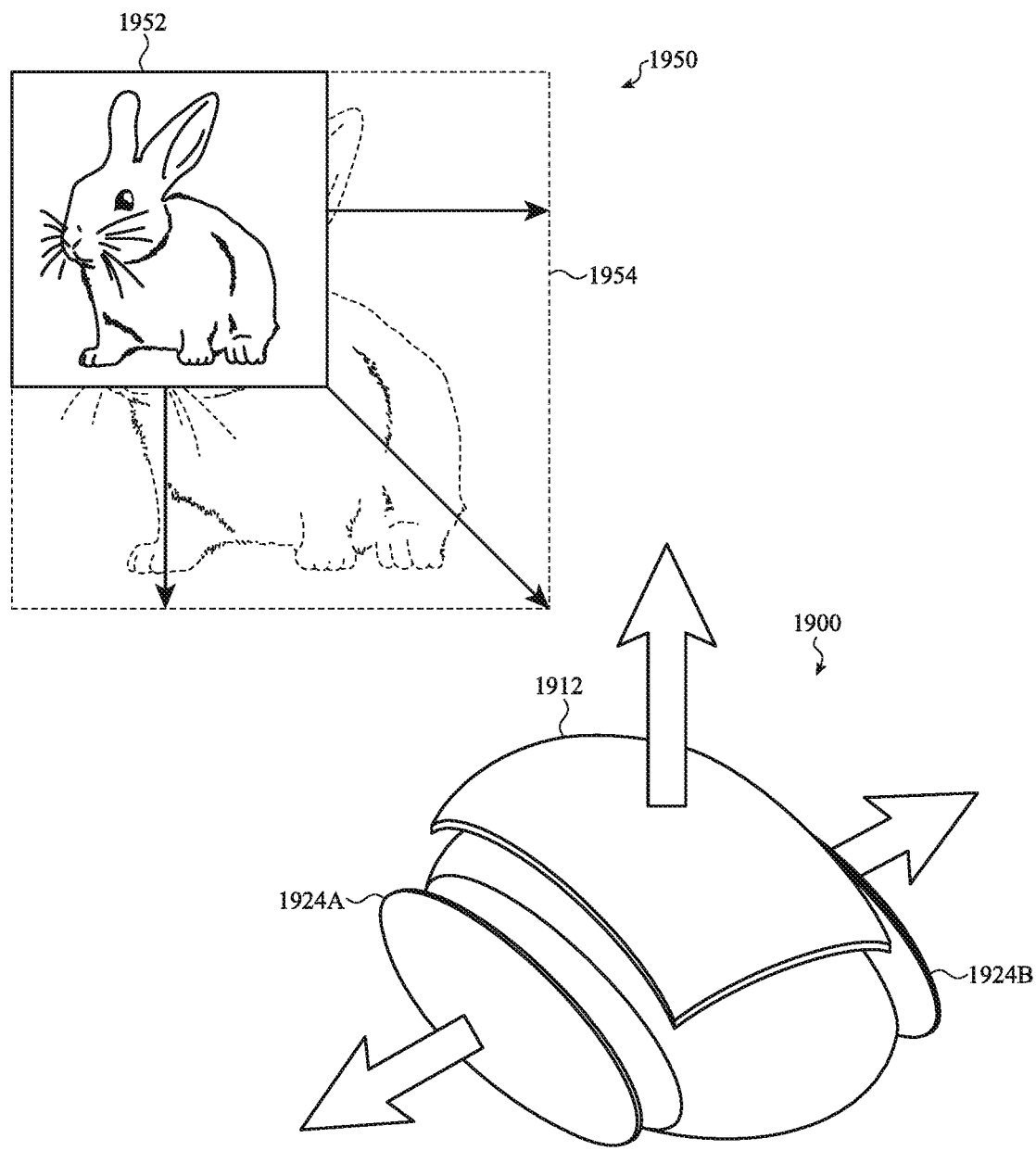
FIG. 19 illustrates an example change in a user interface that corresponds to a change in the shape of a mouse.

In one embodiment, the shape of the mouse may be changed to provide feedback to a user of the mouse and/or an associated computing device. The shape of the mouse may be changed in response to a change at a user interface of a computing device associated with the mouse. FIG. 19 illustrates an example change in a user interface that corresponds to a change in the shape of a mouse 1900. The mouse 1900 includes an articulating member 1912 and side articulating members 1924A and 1924B. The example user interface element 1950 may be displayed as part of a graphical output of a display of a computing device that is in communication with the mouse 1900. As shown in FIG. 19, the user interface element 1950 changes from a first size 1952 to a second size 1954. The shape of the mouse 1900 changes in a manner that corresponds to the change in size of the user interface element. For example, as shown in FIG. 19, the articulating member 1912 and the side articulating members 1924 move outward from the center of the mouse 1900, thereby increasing the overall size of the mouse. In another embodiment, the mouse 1900 may change shape in other ways, for example, reducing in size in response to a user interface element being reduced in size.

Figure 20:
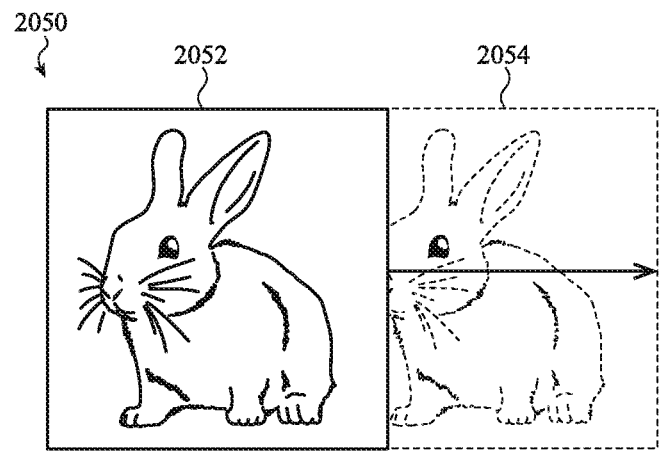
FIG. 20 illustrates an example change in a user interface that results from an input received at a mouse.
Figure 20:
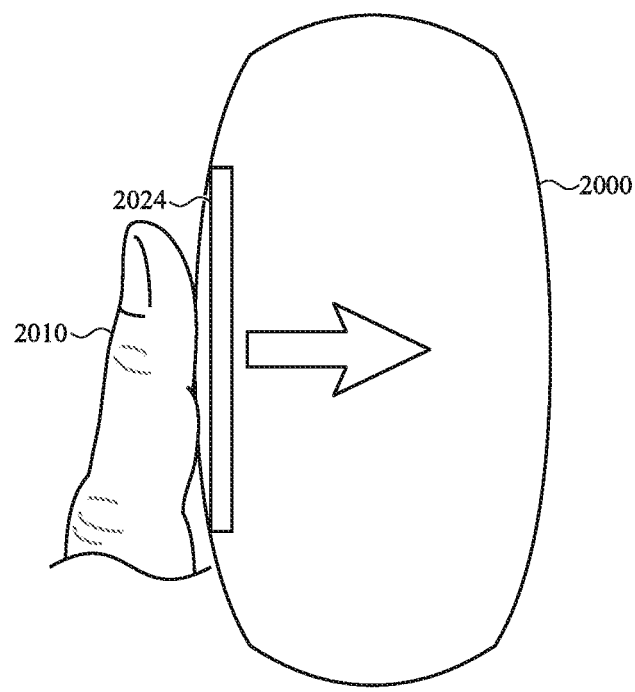

As discussed above, in one embodiment, the articulating member(s) and/or the side articulating member(s) are configured to receive inputs, for example as touch inputs or force inputs. In various embodiments, the articulating members may be configured to provide tactile feedback in response to receiving user inputs. For example, a side articulating member may be configured to move in response to an input. FIG. 20 illustrates an example change in a user interface that results from an input received at a side articulating member 2024 of a mouse 2000. In the example of FIG. 20, a digit 2010 (e.g., a thumb or finger) provides an input at the side articulating member 2024, for example by pressing on the side of the mouse 2000. The example user interface element 2050 may be displayed as part of a graphical output of a display of a computing device that is in communication with the mouse 2000. As shown in FIG. 20, the user interface element 2050 moves from a first position 2052 to a second position 2054 in response to the input received at the side articulating member 2024. The movement of the user interface element 1950 may be related to the input. For example in FIG. 20, the input is a result of a force applied in a particular direction (from left to right with respect to FIG. 20), and the user interface element moves in the same direction.

Figure 21:
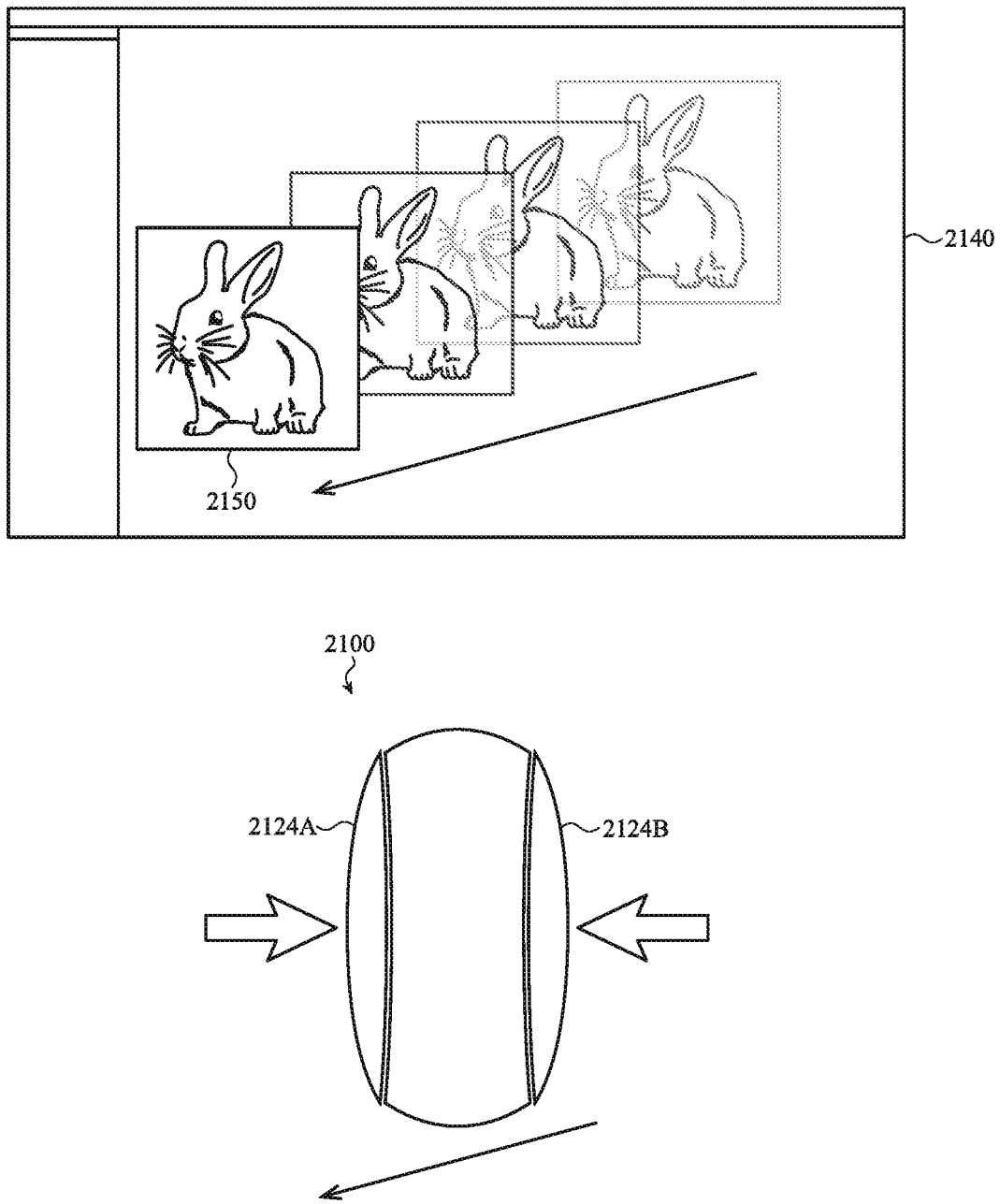
FIG. 21 illustrates an example change in a user interface that results from an input received at a mouse.

In various embodiments, particular inputs received at a mouse may correspond to particular actions or commands in a user interface of a connected computing device. FIG. 21 illustrates an example change in a user interface that results from an input received at side articulating members 2124 of a mouse 2100. In the example of FIG. 21, an input is received in the form of inward forces applied to the side articulating members 2124, for example by a user squeezing the mouse 2100. The input corresponds to a command to move an object (e.g., object 2150) within a user interface 2140 of a connected computing device. As the mouse moves (e.g., downward and leftward with respect to FIG. 21), the object 2150 moves within the user interface, for example in the same direction as the movement of the mouse.

Figure 22:
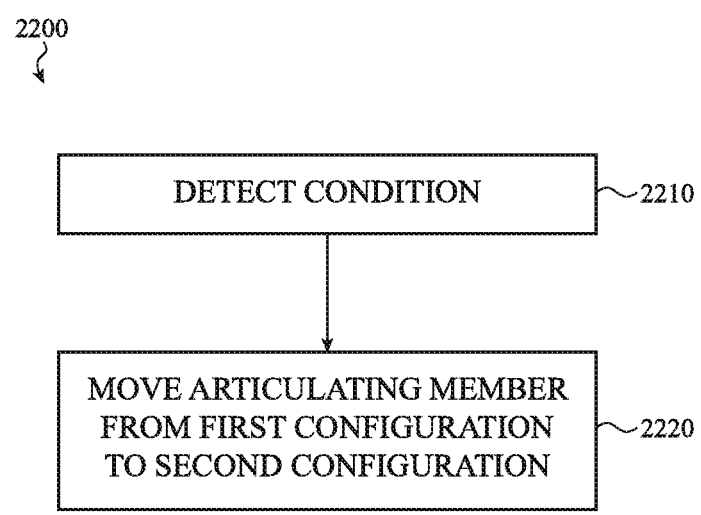
FIG. 22 is a flowchart of an example process for moving an articulating member of a mouse from a first configuration to a second configuration responsive to a detected condition.

FIG. 22 is a flowchart of an example process 2200 for moving an articulating member of a mouse from a first configuration to a second configuration responsive to a detected condition. The example process 2200 may be used to modify a shape of an enclosure of a mouse.

At operation 2210, a processor detects a condition associated with the mouse. The processor may be a processor of a computing device that is connected to the mouse. Detecting the condition may include sensing an amount of an exterior surface of the mouse that is contacting a user's hand as described above with respect to FIGS. 16-18C. The sensors may be capacitive sensors that detect changes in capacitance when a hand is in contact with an area of the surface near the sensor. In one embodiment, the sensors are arranged in an array such that outputs of the sensors may be used to determine how much of the surface is being contacted by a hand. Detecting the condition may include receiving an input at the mouse, as described above with respect to FIGS. 20-21. Detecting the condition may include detecting a change in a user interface of an associated computing device as described above with respect to FIG. 19.

At operation 2220, the processor sends an instruction to move the articulating member from a first configuration to a second configuration as discussed above. For example, if detecting the condition includes determining that the amount of a user's hand that is contacting the exterior surface of the mouse is below a predetermined threshold, the articulating member may be moved to increase the amount of the user's hand that is contacting the exterior surface, for example as described with respect to FIGS. 16-17C. Similarly, if detecting the condition includes detecting an input, the movement of the articulating member may deliver tactile feedback to the user. If detecting the condition includes detecting a change in a user interface, the movement of the articulating member may correspond to the change in the user interface, for example as described with respect to FIG. 19.

It may be appreciated that the devices described herein (e.g., mouse 101) can include one or more components, which, for simplicity of illustration are not depicted herein. For example, the mouse may include a processor coupled to or in communication with a memory, a power supply, one or more sensors, one or more communication interfaces, and one or more input/output devices such as a display, a speaker, a rotary input device, a microphone, an on/off button, a mute button, a biometric sensor, a camera, a force and/or touch sensitive trackpad, and so on.

In some embodiments, the communication interfaces provide electronic communications between the electronic device and an external communication network, device or platform. The communication interfaces can be implemented as wireless interfaces, Bluetooth interfaces, universal serial bus interfaces, Wi-Fi interfaces, TCP/IP interfaces, network communications interfaces, or any conventional communication interfaces. The electronic device may provide information related to externally connected or communicating devices and/or software executing on such devices, messages, video, operating commands, and so forth (and may receive any of the foregoing from an external device), in addition to communications. As noted above, for simplicity of illustration, the electronic devices herein are illustrated without many of these elements, each of which may be included, partially, optionally, or entirely, within a housing.

In some embodiments, the housing can be configured to, at least partially, surround a display. In many examples, the display may incorporate an input device configured to receive touch input, force input, and the like and/or may be configured to output information to a user. The display can be implemented with any suitable technology, including, but not limited to, a multi-touch or multi-force sensing touchscreen that uses liquid crystal display (LCD) technology, light-emitting diode (LED) technology, organic light-emitting display (OLED) technology, organic electroluminescence (OEL) technology, or another type of display technology.

The housing can form an outer surface or partial outer surface and protective case for the internal components of the electronic device. The housing can be formed of one or more components that are operably connected, such as a front piece and a back piece or a top portion and a bottom portion. Alternatively, the housing can be formed of a single piece (e.g., uniform body or unibody).

Furthermore, one may appreciate that although many embodiments are disclosed above, that the operations and steps presented with respect to methods and techniques described herein are meant as exemplary and accordingly are not exhaustive. One may further appreciate that an alternate step order or fewer or additional steps may be implemented in particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A mouse comprising:
an enclosure defining an exterior surface configured to receive a palm of a hand;
an articulating member positioned beneath the exterior surface and comprising a set of stacked layers;
an actuator disposed within the enclosure, coupled to the articulating member, and configured to move the articulating member from a first configuration to a second configuration, the first configuration resulting in the exterior surface having a first curvature and the second configuration resulting in the exterior surface having a second curvature different from the first curvature; and
a jamming mechanism configured to, after the actuator has moved the articulating member to the second configuration resulting in the second curvature, cause a normal force to be exerted on adjacent layers of the set of stacked layers to increase a stiffness of the articulating member and maintain the second curvature.

2. The mouse of claim 1, wherein:
the articulating member comprises an array of segments;
a first segment of the array of segments is pivotally coupled to a second segment of the array of segments; and
the first segment and the second segment are configured to pivot with respect to each other when the articulating member transitions between the first configuration and the second configuration.

3. The mouse of claim 1, wherein:
the articulating member comprises an array of overlapping segments; and
segments of the array of overlapping segments are configured to slide relative to each other when the articulating member transitions between the first configuration and the second configuration.

4. The mouse of claim 1, wherein:
the articulating member includes a magnetic element; and
the actuator includes an electromagnet that is configured to exert a magnetic force on the magnetic element of the articulating member to move the articulating member between the first configuration and the second configuration.

5. The mouse of claim 1, wherein:
the jamming mechanism is a pump configured to apply a vacuum between the adjacent layers of the set of stacked layers; and
the normal force is not exerted while the actuator moves the articulating member from the first configuration to the second configuration.

6. The mouse of claim 1, wherein:
the first configuration results in the enclosure having a first thickness; and
the second configuration results in the enclosure having a second thickness that is greater than the first thickness.

7. The mouse of claim 1, wherein the first configuration results in at least a portion of the exterior surface being flat.

8. The mouse of claim 1, wherein:
the enclosure further comprises a side articulating member;
the mouse further comprises a side actuator configured to move the side articulating member; and
a movement of the side articulating member changes a width of the mouse.

9. A mouse comprising:
an enclosure defining a top surface of the mouse;
an articulating member disposed beneath the top surface of the mouse and comprising an array of segments, the array of segments comprising a first segment positioned between a second segment and a third segment, the first segment pivotally coupled to the second segment along a first side of the first segment and pivotally coupled to the third segment along a second side of the first segment, the second side opposite the first side; and
an actuator disposed within the enclosure and configured to cause the first segment, the second segment, and the third segment of the articulating member to move to change a profile of the top surface from a first profile shape to a second profile shape that is different than the first profile shape.

10. The mouse of claim 9, wherein:
the first profile shape has a first curvature and a first thickness;
the second profile shape has a second curvature and a second thickness;
the second curvature is greater than the first curvature; and
the second thickness is greater than the first thickness.

11. The mouse of claim 9, wherein:
the actuator is a first actuator;
the enclosure further defines a side surface; and
the mouse further comprises a second actuator positioned within the enclosure and configured to move the side surface between a first position and a second position.

12. The mouse of claim 11, wherein:
the side surface is a first side surface;
the enclosure further defines a second side surface; and
the second actuator is configured to change a width of the mouse extending between the first side surface and the second side surface.

13. The mouse of claim 9, wherein:
the enclosure comprises a flexible membrane disposed over the array of segments; and
the flexible membrane defines the top surface.

14. A method for modifying a shape of a mouse comprising:
sensing, using one or more sensors of the mouse, an amount of an exterior surface that is contacting a hand;
determining, using a processor operably coupled to an actuator within the mouse, whether the amount of the exterior surface that is contacting the hand is below a threshold; and
in response to determining that the amount of the exterior surface that is contacting the hand is below the threshold, moving, by the actuator, an articulating member from a first configuration to a second configuration;
wherein:
the first configuration results in the exterior surface of the mouse having a first curvature; and
the second configuration results in the exterior surface of the mouse having a second curvature that is different from the first curvature.

15. The method of claim 14, wherein the method further comprises:
prior to moving the articulating member from the first configuration to the second configuration, unjamming a set of stacked layers of the articulating member; and
after moving the articulating member from the first configuration to the second configuration, jamming the set of stacked layers of the articulating member.

16. The method of claim 15, wherein jamming the set of stacked layers of the articulating member comprises applying a vacuum between adjacent layers of the set of stacked layers.

17. The method of claim 15, wherein a jamming mechanism of the mouse is configured to jam the set of stacked layers of the articulating member.

18. The method of claim 14, wherein:
the amount of the exterior surface is a first amount of the exterior surface; and
in response to the actuator moving the articulating member from the first configuration to the second configuration, the method further comprises:
sensing, using the one or more sensors of the mouse, a second amount of the exterior surface that is contacting the hand; and
determining, using the processor, whether the second amount of the exterior surface that is contacting the hand is below the threshold.

19. The method of claim 18, further comprising, in response to determining that the second amount of the exterior surface that is contacting the hand is below the threshold, moving, by the actuator, the articulating member from the second configuration to a third configuration having a third curvature that is different from both the first curvature and the second curvature.

* * * * *